United States Patent [19]

Berlinger

[11] Patent Number: 5,307,732
[45] Date of Patent: May 3, 1994

[54] PISTON ASSEMBLY HAVING A WRIST PIN BOLTED THEREIN

[75] Inventor: Willibald G. Berlinger, Peoria, Ill.
[73] Assignee: Caterpillar Inc., Peoria, Ill.
[21] Appl. No.: 829,029
[22] PCT Filed: Nov. 29, 1991
[86] PCT No.: PCT/US91/08887
  § 371 Date: Nov. 29, 1991
  § 102(e) Date: Nov. 29, 1991
[51] Int. Cl.⁵ ............................... F16J 1/14
[52] U.S. Cl. ........................ 92/190; 92/216;
   92/219; 92/238; 92/239; 123/193.6
[58] Field of Search ............... 92/187, 189, 190, 191,
   92/216, 219, 220, 221, 238, 239; 123/193.6

[56] References Cited

U.S. PATENT DOCUMENTS

| 1,228,048 | 5/1917 | Rich | 92/220 |
| 1,548,329 | 8/1925 | Nelson | 92/220 |
| 1,681,494 | 8/1928 | Noble | 92/191 |
| 2,059,713 | 11/1936 | Schneider | 92/189 |
| 4,644,853 | 2/1987 | Russell et al. | 92/238 |
| 5,072,654 | 12/1991 | MacGregor | 92/216 |

FOREIGN PATENT DOCUMENTS 0041416 12/1981 European Pat. Off. ......... 123/193.6
0276458 9/1927 United Kingdom .

Primary Examiner—Thomas E. Denion
Attorney, Agent, or Firm—Larry G. Cain

[57] ABSTRACT

The design and construction of past piston assemblies having a wrist pin bolted to a connecting rod have excessive weight and structural components, and requires more complex machining techniques and tooling. The present invention overcomes these problem by providing a piston assembly (30) with a wrist pin (36) attached to a piston member (32). Thus, the length of the leg members (80) are short and do not require a portion surrounding the wrist pin (36). The results being reduced piston member (32) and piston assembly (30) weight and lower inertia, a simplified forging or casting process, a more easily machinable cavity (86) within the piston member (32) and a higher quality piston assembly (30).

16 Claims, 4 Drawing Sheets

PISTON ASSEMBLY HAVING A WRIST PIN BOLTED THEREIN

TECHNICAL FIELD

This invention relates generally to a piston assembly for use in an internal combustion engine, compressor or the like and more particularly to the retention of a piston member to a piston pin.

BACKGROUND ART

The last several years has seen an increasing emphasis being placed on the design of engines to make them more compact, lighter and yet with improved fuel economy, efficiency, reduced emissions, greater service life and increased power output per cylinder. As present day engines are converted or upgraded, the piston assembly is subject to even higher combustion chamber pressures and temperatures.

Attempts have been made to overcome the effects of higher combustion chamber pressures by altering the design of the piston member to include perforated gussets and increased cooling ribs. An example is disclosed in U.S. Pat. No. 4,502,422 issued to David E. Brann on Mar. 5, 1985. A piston and a carrier member are removably attached together and retained by a snap ring. A trunnion pin is positioned within a pair of struts members in the carrier member and is bolted to the connecting rod. Thus, the struts surround the pin and are in rotational relationship thereto.

Another example of a piston assembly is disclosed in U.S. Pat. 4,644,853 issued to Robert A. Russell et. al. on Feb. 24, 1987 wherein a piston assembly has a head member and a skirt member being connected with a pin which is bolted to a connecting rod. The piston head member includes a piston pin connecting section having a pair of arms encircling the pin and structurally connecting the pin to the piston head member in a generally conventional manner.

In another example, U.S. Pat. No. 4,013,057, issued to William D. Guenther on Mar. 22, 1977, discloses a piston assembly. The piston assembly includes separate head and skirt portions. The head portion includes a generally tubular-shaped bearing member having a wrist pin positioned therein and the wrist pin being bolted to the connecting rod. The bearing member, although having an opening therein, extends cylindrically around the pin a sufficient distance to insure that the head portion and the pin remain connected during operation of the piston assembly.

Each of the above described patents discloses a high performance piston assembly. In the structures described, the components are heavy, include excessive structural material and increase the complexity of the engine design by contributing to increased inertia, stresses and weight. For example, each of the pistons include a pair of struts or connecting members which surround or at least partially surround the wrist pin.

The present invention is directed to overcome one or more of the problems as set forth above.

DISCLOSURE OF THE INVENTION

In one aspect of the invention, a piston assembly is comprised of a piston member including a crown having a top surface, a bottom surface, a tubular member depending away from the top surface and having a plurality of grooves therein. The piston member further includes a pair of leg members being positioned radially inwardly of the tubular member, extending from the bottom surface and being spaced one from the other a preestablished distance. Each of the leg members has a mounting surface thereon positioned at an end of the leg member opposite the bottom surface of the crown and has a threaded bore in the mounting surface. The piston assembly further includes a wrist pin having an outer surface with at least a portion thereof in contacting relationship to the mounting surfaces of the piston member. The wrist pin has a pair of bores therethrough. The piston assembly further includes means for fastening the wrist pin to the piston member being positioned in the bores.

In another aspect of the invention, a piston assembly is adapted for use with an internal combustion engine including a block having a bore therein, a crankshaft rotatably mounted in the block, and a connecting rod rotatably connected to the crankshaft. The piston assembly is connected to the connecting rod and is positioned in the bore. The piston assembly is comprised of a piston member including a crown having a top surface, a bottom surface, a tubular member depending away from the top surface and having an outer surface defining a plurality of grooves therein. The piston member further includes a pair of leg members being positioned radially inwardly of the tubular member which extend from the bottom surface and are spaced one from the other a preestablished distance. Each of the leg members have a mounting surface thereon positioned at an end of leg member opposite the bottom surface of the crown and have a threaded bore therein. The piston member further includes a wrist pin including an outer surface having at least a portion thereof in contacting relationship to the mounting surfaces of the piston member. The wrist pin has a pair of bores therethrough. The piston member further includes means for fastening the wrist pin to the piston member being positioned in the bores.

In another aspect of the invention, a piston assembly is comprised of a piston member including a crown having a top surface, a bottom surface, a tubular member depending away from the top surface and having an outer surface defining a plurality of grooves therein. The piston member is further comprised of a pair of leg members being positioned radially inwardly of the tubular member, extending from the bottom surface and being spaced one from the other a preestablished distance. Each of the leg members has a mounting surface thereon positioned at an end of the leg member opposite the bottom surface of the crown and has a threaded bore therein. The piston assembly is further comprised of a wrist pin including an outer surface having at least a portion thereof in contacting relationship to the mounting surfaces of the piston member. The wrist pin has a pair of bores therein. The piston assembly is further comprised of a skirt removably attached to the the wrist pin and being positioned in working relationship to the piston member by the wrist pin and means for retaining the wrist pin within the skirt. A means for fastening the wrist pin to the piston member is positioned in the bores and is further comprised in the piston assembly.

BEST MODE FOR CARRYING OUT THE INVENTION

Figure 1:
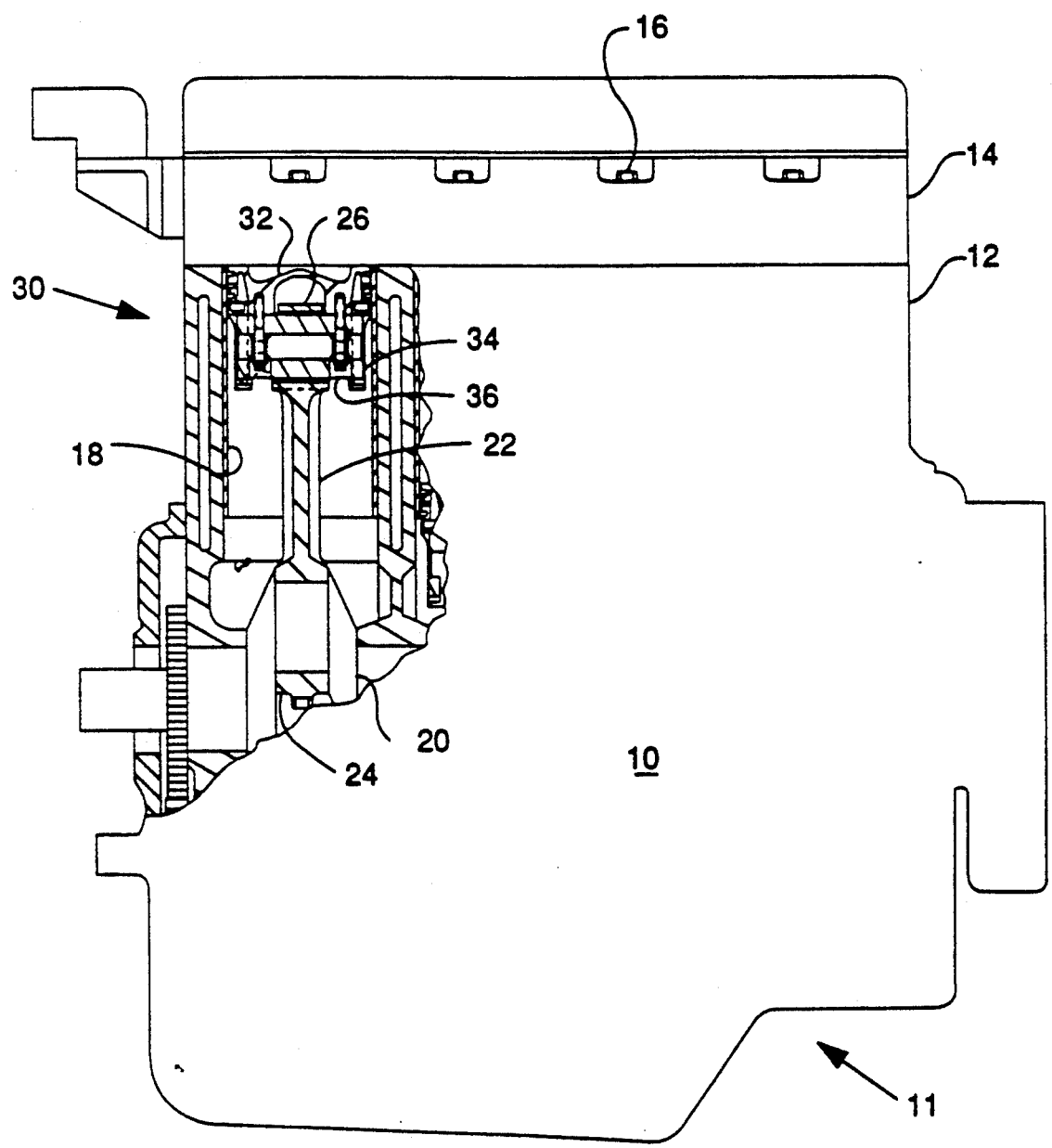
FIG. 1 is a side view of an engine embodying the present invention with portions shown in section for illustration convenience.
Figure 2:
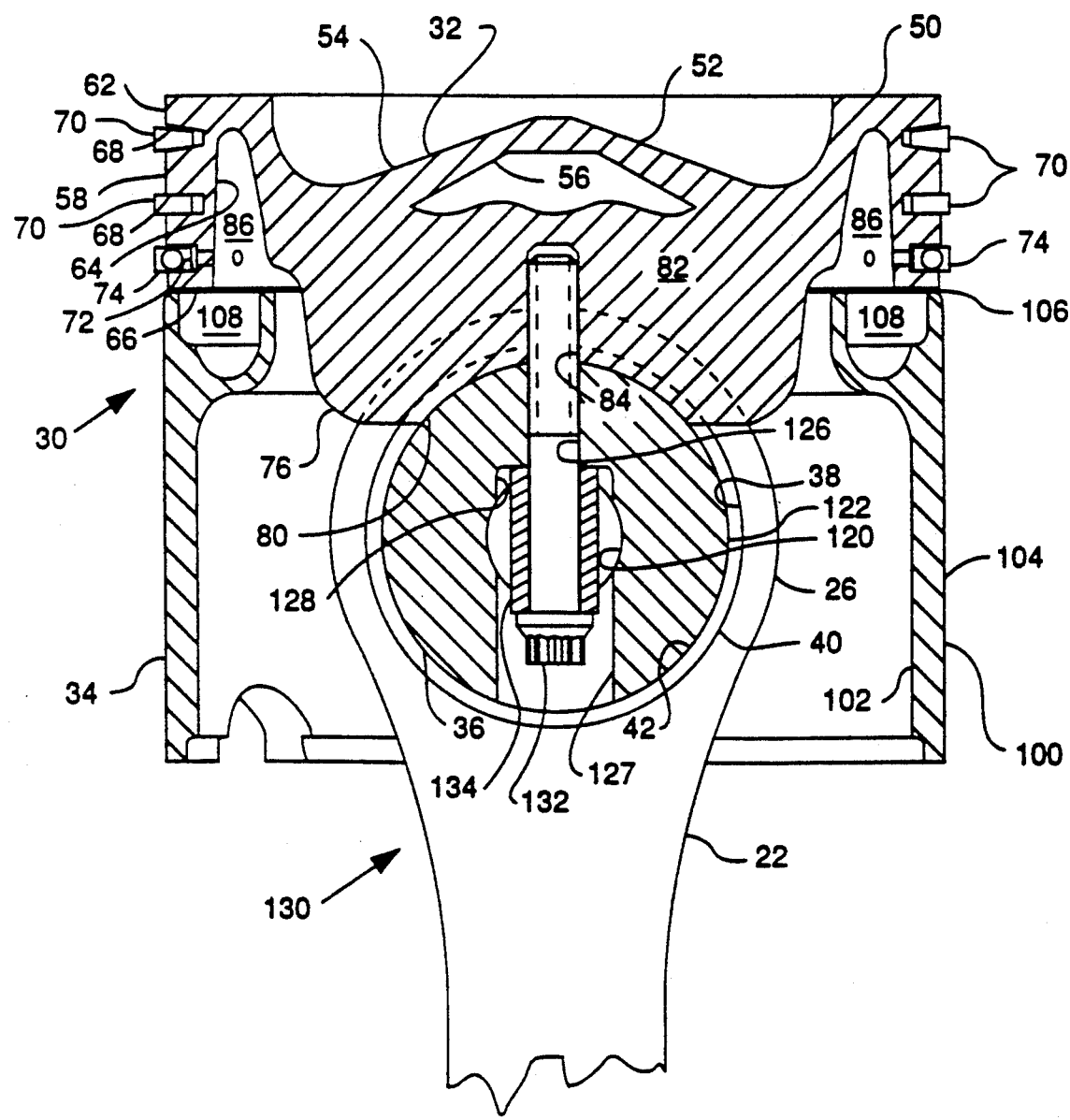
FIG. 2 is an enlarged sectional view of the piston assembly.
Figure 3:
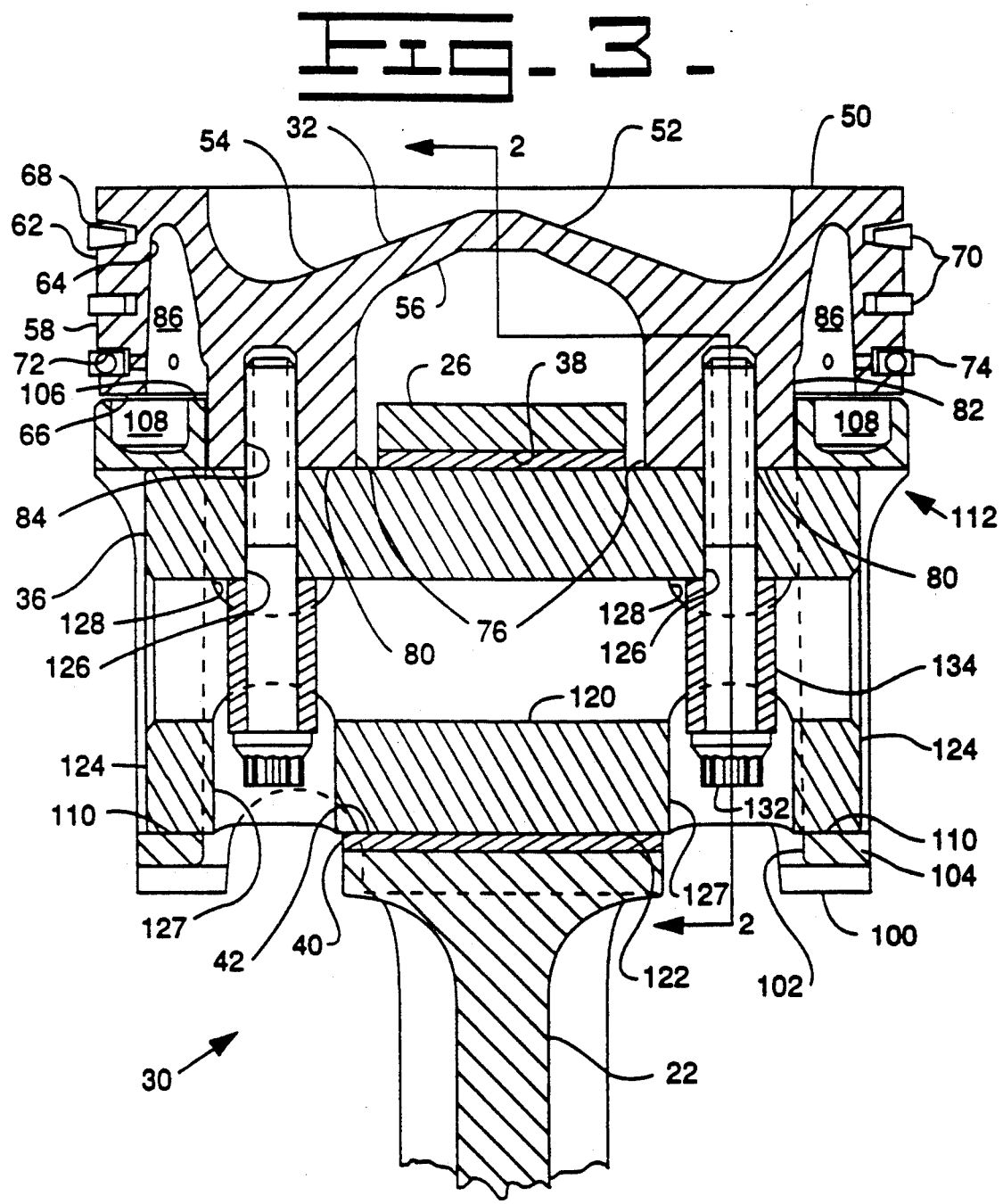
FIG. 3 is an enlarged sectional view of an alternative view of the invention.

Referring to FIG. 1, an internal combustion engine 10 includes a conventional lubricating system 11, a block 12 and a cylinder head 14 rigidly secured to the block 12 by a plurality of fasteners or bolts 16 in a conventional manner. The block 12 includes a plurality of replaceable cylinder liners 18 therein, only one of which is shown. The block 12 could include a plurality of machined cylinder bores without changing the gist of the invention. The engine 10 further includes a crankshaft 20 rotatably positioned therein in a conventional manner. A connecting rod 22 is rotatably attached to the crankshaft 20 at a split end 24 in a conventional manner. An upper eye end 26 of the connecting rod 22 is attached to a piston assembly 30 in a conventional manner. The piston assembly, as best shown in FIGS. 2 and 3, includes an upper steel piston member 32, and a lower aluminum piston skirt 34 which is removably and pivotally mounted on a common wrist pin 36 in a conventional manner.

The upper eye end 26 of the connecting rod 22 has a bore 38 therein and a cylindrically shaped steel-backed bronze sleeve bearing 40 is fixedly positioned in the bore 38 and has a inner bore 42 therein which is sized to rotatably accept the wrist pin 36. In this application, the upper eye end 26 has a stepped configuration; but, as an alternative the upper eye end 26 could be of keystone or wedge-shaped configuration without changing the gist of the invention.

The upper steel piston member 32 includes a main body 50 having a generally cylindrical configuration. The main body 50 includes a crown 52 having a top surface 54 and a bottom surface 56. A relative short, generally cylindrical tubular member 58 depends away from the top surface 54 at the extremity of the crown 52. The tubular member 58 is defined by an outer surface 62, an inner surface 64 and a bottom portion 66. Defined in the outer surface 62 is a pair of peripheral grooves 68 for receipt of a pair of compression rings 70 and a further peripheral groove 72 for receipt of a conventional oil ring 74. A pair of leg members 76 are positioned radially inwardly of the tubular member 58, depend from the bottom surface 56 of crown 52 and terminate at a mounting surface 80 positioned at an end of the leg member 76 opposite the bottom surface 56 of the crown 52. A strut portion 82 of the leg member interconnects the mounting surface 80 with the bottom surface 56 of the crown 52. The pair of leg members 76 are spaced a preestablished distance from each other. The contour of the mounting surface 80 has a configuration to abut a corresponding contour configuration on the wrist pin 36. For example, the mounting surface 80 in this application has a generally part circular configuration, but as an alternative could be flat or any configuration which would correspond to the contour of the wrist pin 36 being used. As best shown in FIG. 2, the part circular configuration of the mounting surface 80 includes an arcuate length of about 110 degrees but could include any arcuate length of 180 degree or less. A threaded bore 84 is generally centrally positioned in each of the mounting surface 80 and extends into the strut portion 82. Interposed between the tubular member 58 and the strut portions 82 and at least a portion of the bottom surface 56 of the crown 52 is a cavity 86. The cavity 86 is defined by the inner surface 64 of the tubular member 58 and a portion of the strut portion 82 of the leg members 76.

The lower aluminum piston skirt 34 includes a generally elliptical member 100 having a inner side wall surface 102 and an outer side wall surface 104. An upper end 106 of the cylindrical member 100 has an annular groove 108 positioned therein which opens upwardly toward the bottom portion 66 of the tubular member 58. A pair of coaxially aligned bores 110 extends through the skirt 34 between the inner side wall surface 102 and the outer side wall surface 104. Means 112 positions the wrist pin 36 within the pair of bores 110. The means 112, in this application, includes the relative close fit between the inner side wall surface 102 and the pair of leg members 76. As an alternative a conventional snap ring and groove could be positioned in the inner surface 114. As an alternative, the skirt 34 could be generally cylindrical without changing the gist of the invention.

The wrist pin 36, in this application, has a hollow substantially cylindrical configuration being centered about an axis. The wrist pin 36 could, as an alternative, be of a solid rod configuration without changing the gist of the invention. The wrist pin 36 has an inner surface 120 and an outer surface 122 generally symmetrical about the axis and a pair of ends 124. The wrist pin 36 has a pair of bores 126 extend through the cylindrical configuration. The pair of bores 126 are spaced a preestablished distance apart so as to align with the threaded bores 84 in the mounting surfaces 80. In this application, a portion of the through bores 126 has an enlarged end 127 which passes between the outer surface 122 and the inner surface 120. Each bore of the pair of bores 126 has a counterbore 128 therein which is defined in the inner surface 120. A fastening means 130, which in this application includes a pair of bolts 132 each having a spacer 134 thereon, are positioned through the pair of bores 126 and threadedly engage each of the threaded bores 84.

Figure 4:
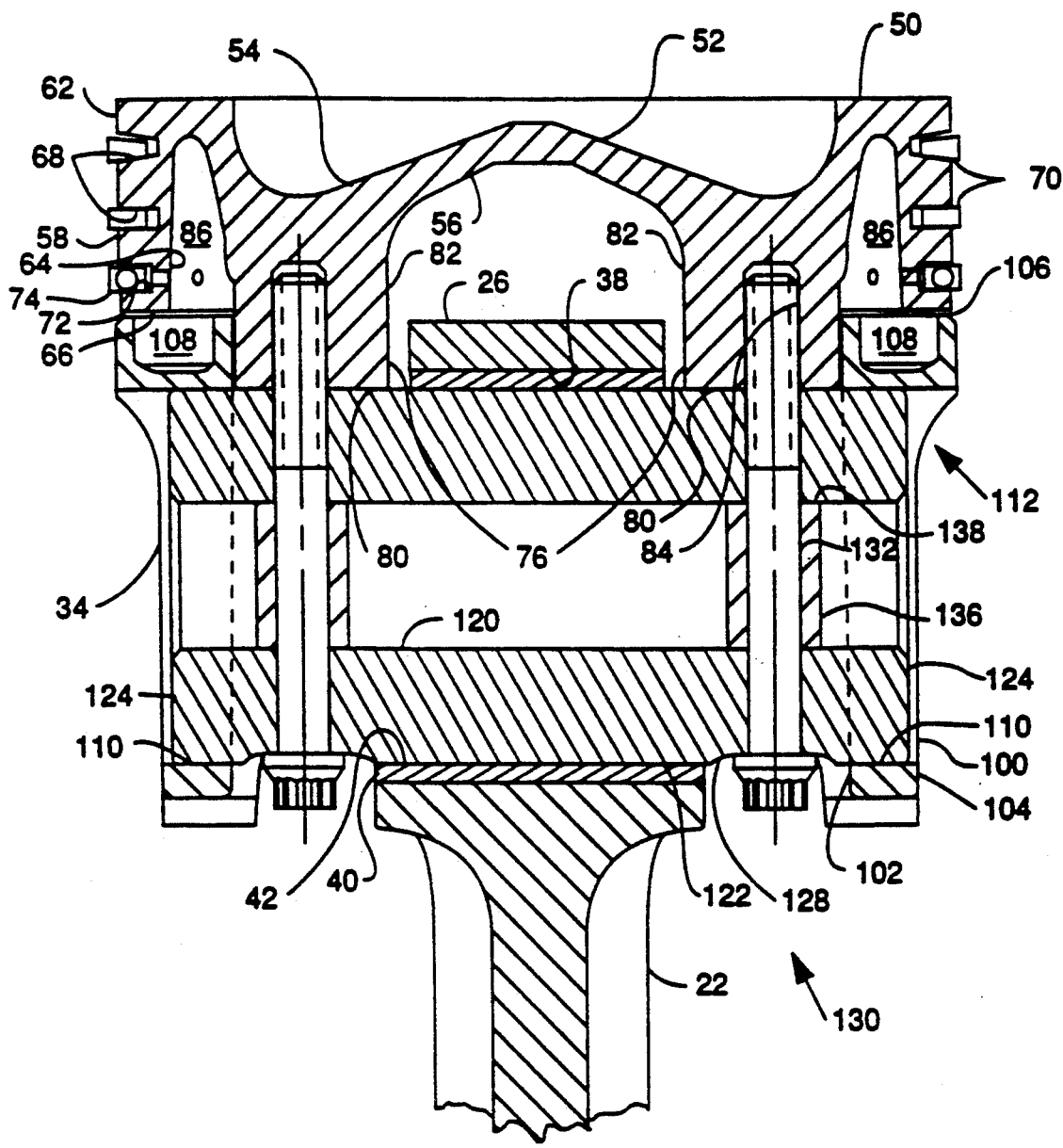

As an alternative and best shown in FIG. 4, the wrist pin 36 could include the pair of bores 126 having the counterbore 128 therein which is defined in the outer surface 122. The pair of bolts 132 would be positioned through the pair of coaxial bores 126 and threadedly engage each of the threaded bores 84. As a further alternative, a spacer 134 could be positioned about the portion of the bolts 132 within the hollow portion of the wrist pin 36. The ends of the spacer 134 would have a contour surface 138 to allow contact with the contour of the inner surface 120 of the wrist pin 36.

Industrial Applicability

In this specific example, the piston assembly 30 is of the articulated design and is positioned in the cylinder bore 18 of an engine 10. The piston assembly 30 is assembled prior to assembling in the engine 10. For example, the main body 50 of the piston assembly 30 is placed on a table or work area with the top surface 54 of the crown 52 in contact with the table. The compression rings 70 are assembled in the respective one of the pair of peripheral grooves 68 in the crown 52 and the oil ring 74 is assembled in the peripheral groove 72. The skirt 34 is positioned over the leg members 60 with the upper end 106 contacting the bottom portion 66 of the tubular member 58. The connecting rod upper eye end 26 is positioned with the inner bore 42 axially aligned with the pair of coaxially aligned bores 110 in the skirt 34 and the wrist pin 36 is inserted through one of the bores 110 in the skirt 34, the inner bore 42 of the steel-backed bronze sleeve bearing 40 and exits the other of the bores 110. During the assembly of the wrist pin 36 into the skirt 34 and the connecting rod 22, the upper end 106 of the skirt 34 will loose contact with the bottom portion 66 and a space will be formed therebetween. During this operation, the outer surface 120 of the wrist pin 36 will be positioned in contact with the mounting surface 80 of the leg members 60. The wrist pin 36 will be rotated to align the pair of bores 126 therein with the threaded bore 84 in the leg members 76. The counterbores 128 are positioned away from the mounting surface 80 and the bolt 132 and space 134 are inserted through the respective counterbores 128 and threadedly engaged with the threaded bores 84. The spacer 134 insures that the bolt length is appropriate to allow for bolt stretch insuring that the bolts 132 remain tight and fixedly in position during the operation of the engine 10. Thus, the wrist pin 36 removably attaches the skirt 34 to the piston assembly 30.

After having assembled the piston assembly 30 and the connecting rod 22, the combination is inserted into the bore 18 in a conventional manner, such as inserting the connecting rod 22 into the bore 18 and using a ring compressor to compress the rings 70,72 allowing the piston assembly to be inserted into the bore 18. Thus, the split end 24 of the connecting rod 22 can be rotatably attached to the crankshaft 20.

In operation, the engine 10 is operated and during the power stroke the major force, which is developed during combustion or the power stroke, is applied to the top surface 54 of each of the piston assemblies 30. The load or force results in compressive loads or forces being transmitted from the top surface 54 through the crown 52 into the strut portion 82 of each of the leg members 76 to the mounting surface 80. From the mounting surface 80, the force is transmitted into the portion of the outer surface 122 of the wrist pin 36 in contact with the mounting surface 80 and into the wrist pin 36. The force from the wrist pin 36 is transferred to the connecting rod 22 in a conventional manner and results in the rotation of the crankshaft 20.

During the exhaust stroke of the engine 10, a lower secondary force results in compressive loads or forces being transmitted from the crankshaft 20 through the connecting rod 22 to move the top surface 54 of the crown 52 toward the head 14 wherein combusted gases are evacuated from the bore 18 in a conventional manner. The force from the crankshaft 20 is transferred through the connecting rod 22 into the outer surface 122 of the wrist pin 36 and into the mounting surface 80 of the leg members 76. The force is further transmitted through the strut portion 82 of the leg members 76 and into the bottom surface 56 of the crown 52. Thus, the combusted gases are exhausted.

During the portion of the operation of the engine 10 commonly referred to as the intake stroke which occurs in functional order after the exhaust stroke, as the top surface 54 reaches its position nearest to the head 14, the crankshaft 20 rotationally reverses the forces applied to the piston assembly 30 resulting in tension forces or loads being resisted by the components. For example, as the crankshaft 20 rotates the connecting rod 22 is pulled or moved away from the head 14 and the forces attempt to pull or separate the contact of the outer surface 122 of the wrist pin 36 from the mounting surface 80 of the piston member 32. Thus, the bolts 132 and the threaded bores 84 must resist the loads or forces during the intake stroke. Additionally, further forces are attempting to separate the contact of the outer surface 122 of the wrist pin 36 from the mounting surface 80 of the piston member 32. For example, as defined above, at the point where the piston assembly 30 has moved upwardly toward the head 14 and changes direction and begins to move away from the head 14, the inertia forces within the piston assembly 30 further apply a tension force to the bolts 132 and the threaded bores 84. Thus, the lighter the construction of the piston assembly 30, the lower the inertia and the greater the dependability of the piston assembly 30.

The piston assembly 30 of the present invention has a reduced weight due to the method of attaching the wrist pin 36 to the piston member 32. For example, the leg members 76 do not require a component which totally encircles the wrist pin 36 and result in a shorter length from the bottom surface 54 of the crown 50 to the mounting surface 80. Furthermore, the shorter length of the leg members 76 reduces the machining costs of the cavity 86 used to provide piston assembly cooling in conjunction with the conventional cooling system 11. For example, the shorter length of the leg member 76 allows a shorter extension to be attached to the cutting tool used to form the cavity 86. Furthermore, the shorter extension reduces tool chatter, allowing the cutting speed to be increased and providing a better surface finish to the cavity 86. Thus, the present invention reduces piston assembly weight, lowers material cost and inertia, simplifies the forging or casting process and reduces machining complexity. The result of the above includes lowering the tooling cost, increasing productivity and increasing machining quality.

other aspects, objects and advantages of this invention can be obtained from a study of the drawings, the disclosure and the appended claims.

I claim:
1. A piston assembly (30), comprising:
 a piston member (32) including a crown (52) having a top surface (54), a bottom surface (56), a tubular member (58) depending away from the top surface (54) and having an outer surface (62) defining a plurality of grooves (68,72) therein, a pair of leg members (76) being positioned radially inwardly of the tubular member (58) and being spaced therefrom forming a cavity (86) therebetween, extending from the bottom surface (56) and being spaced one from the other a preestablished distance, each of said leg members (76) having a mounting surface (80) thereon positioned at an end of the leg members (76) opposite the bottom surface (56) of the crown (52) and having a threaded bore (84) therein;
 a wrist pin (36) including an outer surface (122) having at least a portion thereof in contacting relationship to the mounting surfaces (80) of the piston member (32) and an inner surface (120), said wrist pin (36) having a pair of bores (126) therethrough each of said pair of bores (126) having an enlarged end (127) passing between the outer surface (122) and the inner surface (120); and
 means for fastening (130) the wrist pin (36) to the piston member (32), said means for fastening (130) being positioned in the bores (126).

2. The piston assembly (30) of claim 1 wherein said mounting surface (80) has a generally part circular configuration including an arcuate length being about 110 degrees.

3. The piston assembly (30) of claim 1 wherein said pair of bores (126) each include a counterbore (128).

4. The piston assembly (30) of claim 3 wherein said means (130) for fastening includes a pair of bolts (132) having a spacer (134) thereon.

5. The piston assembly (30) of claim 1 wherein said piston assembly (30) includes a main body (50) and a removable piston skirt (34).

6. A piston assembly (30) adapted for use with an internal combustion engine (10) including a block (12) having a bore (18) therein, a crankshaft (20) rotatably mounted in the block (12), a connecting rod (22) rotatably connected to the crankshaft (20) and said piston assembly (32) being connected to the connecting rod (22) and positioned in the bore (18), said piston assembly (32) comprising:

a piston member (32) including a crown (52) having a top surface (54), a bottom surface (56), a tubular member (58) depending away from the top surface (54) and having an outer surface (62) defining a plurality of grooves (68,72) therein, a pair of leg members (76) being positioned radially inwardly of the tubular member (58) and being spaced therefrom forming a cavity (86) therebetween, extending from the bottom surface (56) and being spaced one from the other a preestablished distance, each of said leg members (76) having a mounting surface (80) thereon positioned at an end of the leg members (76) opposite the bottom surface (56) of the crown (52) and having a threaded bore (84) therein;

a wrist pin (36) including an outer surface (122) having at least a portion thereof in contacting relationship to the mounting surfaces (80) of the piston member (32) and an inner surface (120), said wrist pin (36) having a pair of bores (126) therethrough each of said pair of bores (126) having an enlarged end (127) passing between the outer surface (122) and the inner surface (120); and means for fastening (130) the wrist pin (36) to the piston member (32), said means for fastening being positioned in the bores (126).

7. The piston assembly (30) of claim 6 wherein said mounting surface 80 has a generally part circular configuration including an arcuate length being about 110 degrees.

8. The piston assembly (30) of claim 6 wherein said pair of bores (126) each include a counterbore (128).

9. The piston assembly (30) of claim 8 wherein said means (130) for fastening includes a pair of bolts (132) having a spacer (134) thereon.

10. The piston assembly (30) of claim 6 wherein said piston assembly (30) includes a main body (50) and a removable piston skirt (34).

11. An articulated piston assembly (30), comprising:

a piston member (32) including a crown (52) having a top surface (54), a bottom surface (56), a tubular member (58) depending away from the top surface (54) and having an outer surface (62) defining a plurality of grooves (68,72) therein, a pair of leg members (76) being positioned radially inwardly of the tubular member (58) and being spaced therefrom forming a cavity (86) therebetween, extending from the bottom surface (56) and being spaced one from the other a preestablished distance, each of said leg members (76) having a mounting surface (80) thereon positioned at an end of the leg members (76) opposite the bottom surface (56) of the crown (52) and having a threaded bore (84) therein;

a wrist pin (36) including an outer surface (122) having at least a portion thereof in contacting relationship to the mounting surfaces (80) of the piston member (32) and an inner surface (120), said wrist pin (36) having a pair of bores (126) therethrough;

a skirt (34) removably attached to the wrist pin (36) and being positioned in pivotal working relationship to the piston member (32) by the wrist pin (36);

means for retaining the wrist pin (36) within the skirt (34); and means for fastening (130) the wrist pin (36) to the piston member (32), said means for fastening being positioned in the bores (126).

12. The piston assembly (30) of claim 11 wherein said mounting surface (80) has a generally part circular configuration including an arcuate length being about 110 degrees.

13. The piston assembly (30) of claim 11 wherein said pair of bores (126) each include a counterbore (128).

14. The piston assembly (30) of claim 13 wherein said means (130) for fastening includes a pair of bolts (132) having a space (134) thereon.

15. The piston assembly (30) of claim 11 wherein said skirt (34) includes an upper end (106) having an annular groove (108) defined therein.

16. The piston assembly (30) of claim 15 wherein said skirt (34) further includes an inner side wall surface (102), an outer side wall surface (104), a pair of coaxially aligned bores (110) extending between the inner side wall surface (102) and the outer side wall surface (104) and said wrist pin 36 extending through the bores (110) and removably attaching the skirt (34) to the piston assembly (30).

* * * * *